United States Patent
Robie et al.

(10) Patent No.: US 9,411,851 B2
(45) Date of Patent: *Aug. 9, 2016

(54) DATABASE-INDEPENDENT MECHANISM FOR RETRIEVING RELATIONAL DATA AS XML

(71) Applicant: Progress Software Corporation, Bedford, MA (US)

(72) Inventors: Jonathan Robie, Durham, NC (US); Peter Coppens, Antwerp (BE); Marc Van Cappellen, Meise (BE)

(73) Assignee: Progress Software Corporation, Bedford, MA (US)

( * ) Notice: Subject to any disclaimer, the term of this patent is extended or adjusted under 35 U.S.C. 154(b) by 312 days.

This patent is subject to a terminal disclaimer.

(21) Appl. No.: 13/872,967

(22) Filed: Apr. 29, 2013

(65) Prior Publication Data

US 2013/0238604 A1  Sep. 12, 2013

Related U.S. Application Data

(63) Continuation of application No. 11/283,224, filed on Nov. 18, 2005, now Pat. No. 8,447,774.

(60) Provisional application No. 60/630,837, filed on Nov. 23, 2004.

(51) Int. Cl.
*G06F 17/30* (2006.01)

(52) U.S. Cl.
CPC .... *G06F 17/30427* (2013.01); *G06F 17/30545* (2013.01)

(58) Field of Classification Search
CPC .............. G06F 17/30932; G06F 17/30917; G06F 17/30923; G06F 17/30427; G06F 17/30545; G06F 17/30566
See application file for complete search history.

(56) References Cited

U.S. PATENT DOCUMENTS

| 6,282,537 | B1 * | 8/2001 | Madnick et al. ............ 707/716 |
| 6,507,834 | B1 * | 1/2003 | Kabra et al. .............. 707/718 |
| 6,601,062 | B1 * | 7/2003 | Deshpande et al. | |
| 7,028,028 | B1 * | 4/2006 | Balmin et al. ............ 707/760 |
| 2001/0047353 | A1 * | 11/2001 | Talib et al. .............. 707/3 |
| 2004/0015783 | A1 * | 1/2004 | Lennon et al. ............ 715/523 |

(Continued)

OTHER PUBLICATIONS

Gardarin et al. "Integrating Heterogeneous Data Sources with XML and XQuery" Proceedings of the 13th International Workshop on Database and Expert Systems Applications. 2002. 6 pages.*

(Continued)

*Primary Examiner* — James E Richardson
(74) *Attorney, Agent, or Firm* — Patent Law Works LLP (57) ABSTRACT

Techniques are disclosed for retrieving both data stored in relational form and data stored in XML form responsive to a single XQuery query. The techniques allow applications to retrieve relational data residing in various relational database management systems by using XQuery and XQuery for Java. In one such embodiment, an embeddable serverless computer component implements the techniques, and includes a combination of one or more relational adaptors and a mediator to access relational data and transform it into appropriate XML. The techniques are embeddable, and can be standards-based, database-independent, and operating-system independent. Optimized performance and scalability from desktop to enterprise applications are enabled as the number of users and/or database size increases.

20 Claims, 3 Drawing Sheets

(56) References Cited

U.S. PATENT DOCUMENTS

| | | | | |
|---|---|---|---|---|
| 2004/0167904 A1* | 8/2004 | Wen et al. | ...................... | 707/100 |
| 2004/0260685 A1* | 12/2004 | Pfleiger et al. | ..................... | 707/3 |
| 2004/0260691 A1* | 12/2004 | Desai et al. | ........................ | 707/4 |
| 2004/0267760 A1* | 12/2004 | Brundage et al. | ............. | 707/100 |
| 2005/0066058 A1* | 3/2005 | An et al. | ........................ | 709/246 |
| 2005/0138047 A1* | 6/2005 | Liu et al. | ...................... | 707/100 |
| 2005/0289175 A1* | 12/2005 | Krishnaprasad et al. | ..... | 707/102 |
| 2006/0031204 A1* | 2/2006 | Liu et al. | ............................. | 707/3 |

OTHER PUBLICATIONS

Pawlan. "J2EE Application Client". Apr. 6, 2011. 16 pages. [online], [Archived at archive.org on Dec. 19, 2003], [retrieved on Sep. 18, 2012]. Retrieved from the Internet<URL: http://web.archive.org/web/20031219135611/http://java.sun.com/developer/technicalArticles/J2EE/appclient/>.*

"JSR 225: XQuery API for Java™ (XQJ) Java Specification Requests". [online] [retrieved on Sep. 18, 2012]. Retrieved from the Internet <URL: http://jcp.org/en/jsr/detail?id=225> 1 page.*

Michels, Jan-Eike. "XQuery API for JavaTM (XQJ) 1.0 Specification" Java Community Process [online], Version 0.2.1, May 10, 2004 [retrieved on Apr. 21, 2010]. Retrieved from the Internet:<URL: http://jcp.org/aboutJava/communityprocess/edr/jsr225/index.html>, 80 pages.*

Eisenberg et al. "An early look at XQuery API for JavaTM (XQJ)" ACM SIGMOD Record [online]. vol. 33, Issue 2, Jun. 2004 [retrieved on Apr. 21, 2010]. Retrieved from the Internet:<URL:http://doi.acm.org/10.1145/1024694.1024717>, 7 pages.*

Manolescu et al., "Answering XML Queries over Heterogeneous Data Sources", 2001, Proceedings of the 27th VLDB Conference, 10 Pages.*

Boag et al., "XQuery 1.0: An XML Query Language" [online], Nov. 12, 2003, W3C, [retreived on Nov. 28, 2007]. Retrieved from the Internet<URL:http://www.w3.org/TR/2003/WD-xquery-20031112/>.*

Re et al., "Distributed XQuery" [online], Sep. 2004, [retreived on Sep. 28, 2009]. Retrieved from the Internet<URL:http://pages.cs.wisc.edu/~chrisre/papers/paper-distributed-xquery-2004.pdf>.*

* cited by examiner

DATABASE-INDEPENDENT MECHANISM FOR RETRIEVING RELATIONAL DATA AS XML

RELATED APPLICATIONS

This application is a continuation of prior U.S. Pat. No. 8,447,774, filed Nov. 18, 2005, which claimed the benefit of U.S. Provisional Application No. 60/630,837, filed on Nov. 23, 2004. Each of the applications is herein incorporated in its entirety by reference.

BACKGROUND OF THE INVENTION

1. Field of the Invention

The invention related to data processing, and more particularly, to data transformation between relational data and XML data.

2. Description of the Related Art

Primarily queried from relational databases, business-critical data is increasingly required to be exchanged and processed as either XML data, or a combination of XML and relational data. However, using XML with relational databases has its challenges. For instance, each major database vendor provides XML extensions, but these extensions are different for each vendor and do not allow applications to be portable among databases. Some developers use XML standards (such as DOM, SAX, or StAX) in combination with database standards (such as ODBC or JDBC), but this approach requires developers to write and maintain large amounts of code.

Recognizing such challenges, the World Wide Web Consortium (W3C) developed XQuery (short term for XML Query) as a uniform language for data exchange. In the same way the SQL provides a query language for relational databases, XQuery provides a common language for accessing XML data stores and any data that can be viewed as XML (such as relational data). Thus, the amount of code developers must write and maintain to use XML and relational data together is reduced. The W3C XQuery specification and its supporting documentation are herein incorporated by reference in their entirety. As are the XML Path Language (XPath) specification and its supporting documentation. XQuery uses XPath syntax to address specific parts of an XML document.

However, there is currently no mechanism that allows application developers to retrieve relational data as XML using both a standard query language and a standard API. Rather, application developers must rely on either home-grown solutions or on a vendor-specific combination of proprietary API (or API extensions) and a standard query language, like SQL/XML or XQuery.

What is needed, therefore, are techniques that allows application developers to retrieve relational data as XML using both a standard query language and a standard API.

SUMMARY OF THE INVENTION

One embodiment of the present invention provides a method for transforming between relational data and XML data, using an embedded serverless computer component. The method includes receiving an XQuery query from a Java application via an XQuery API for Java (XQJ), the application attempting to access a relational data source. The method continues with generating XML results responsive to the XQuery query, based on data from the relational data source. The method also includes sending the XML results to the Java application via the XQJ. In one such case, generating XML results responsive to the XQuery query includes retrieving both data stored in relational form and data stored in XML form responsive to a single XQuery query. The method may include analyzing the XQuery query, and dividing it into one or more XQuery expressions to be processed. In one such case, for at least one of the XQuery expressions, the method continues with determining if an XML or relational, data source is being queried. Generating XML results responsive to the XQuery query may further include combining results from multiple data sources. The method may include executing at least one XQuery expression in the embedded serverless computer component, using data retrieved from the relational data source. Generating XML results responsive to the XQuery query may be preceded by determining if an XML data source is also being queried. In one such case, and in response to relational data source queries, generating XML results includes: translating the XQuery query into an SQL query, querying the relational data source with the SQL query, receiving the SQL query results, and mapping the SQL query results into XML. In another such case, and in response to XML data source queries, generating XML results includes: querying the XML data source with the XQuery query, and receiving the XML XQuery query results. The method may include using value comparisons instead of general comparisons, to make queries run faster. The method may include using query pooling so as to reuse queries that have previously been executed, to make queries run faster. The method may include using at least one of option declarations to process queries, and extension expressions to process expressions in a query.

Another embodiment of the present invention provides a machine-readable medium (e.g., compact disk, diskette, server, memory stick, or hard drive) encoded with instructions, that when executed by a processor, cause the processor to carry out a process for transforming between relational data and XML data, using an embedded serverless computer component. This process can be, for example, similar to or a variation of the previously described method.

Another embodiment of the present invention provides an embeddable serverless computer component system for transforming between relational data and XML data. The system can install, for example, like a driver. The system includes an XQuery interface for receiving an XQuery query from an application attempting to access a relational data source. The system further includes an XQuery engine for generating XML results responsive to the XQuery query, based on data from the relational data source, and sending the XML results to the application via the XQuery interface. The XQuery interface can be, for example, an XQuery API for Java (XQJ) module and the application can be a Java application. In one particular case, the system is configured for retrieving both data stored in relational form and data stored in XML form responsive to a single XQuery query. In another particular configuration, the XQuery engine includes a mediator module for analyzing the XQuery query, and dividing it into one or more XQuery expressions to be processed. In one such case, and for at least one of the XQuery expressions, the mediator module is for determining if an XML or relational data source is being queried. The mediator module can be further configured for combining results from multiple data sources. The mediator module can be configured for executing at least one XQuery expression using data retrieved from the relational data source. The XQuery engine may include an SQL adapter for translating a relational data source, XQuery query into an SQL query, querying the relational data source with the SQL query, receiving the SQL query results, and mapping the SQL query results into XML.

The XQuery engine may include an XML adapter for querying the XML data source with an XML data source XQuery query, and receiving the XML XQuery query results. The system may be configured for using value comparisons instead of general comparisons, to make queries run faster, and/or for using query pooling so as to reuse queries that have previously been executed, to make queries run faster. The system may be configured for using at least one of option declarations to process queries, and extension expressions to process expressions in a query.

The system functionality can be implemented, for example, in software (e.g., executable instructions encoded on one or more computer-readable mediums), hardware (e.g., gate level logic), firmware (e.g., one or more microcontrollers with embedded routines), or some combination thereof, or other suitable means.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Techniques are disclosed that allow application developers to retrieve relational data as XML using both a standard query language and a standard API. The techniques are embeddable, and can be standards-based, database-independent, and operating-system independent. No server is required. Optimized performance and scalability from desktop to enterprise applications are enabled as the number of users and/or database size increases.

Overview

One embodiment of the present invention is a serverless computer component (e.g., shared library or executable) for retrieving relational and/or XML data responsive to a single XQuery query from an application. In one particular configuration, this component is implemented as a Java implementation of XQuery that uses the XQuery API for Java (XQJ). Applications are allowed to query XML sources, relational sources, or a combination of the two. The results are integrated for XML-based data exchange, XML-driven Web sites, and other applications that require or leverage the power of XML. The XML results can be returned in any number of forms, such as text, DOM (document object model), SAX (simple API for XML), or StAX (streaming API for XML).

Such an embodiment can run in any Java environment, on any operating system, using any number of databases, with or without application servers or other servers. Developers and independent software vendors who need to manage heterogeneous data sources in XML applications are thus allowed to work with standards instead of proprietary query language extensions and APIs. Numerous relational and XML sources can be used. In addition, XML queries that access data from relational sources are optimized to achieve high performance.

As previously explained, XQuery is a query language for XML. XQuery is used to query XML in a manner that is similar to the way SQL is used to query relational tables. Typically, SQL queries create tables to represent the result of a query, and XQuery queries create XML to represent the result of a query. This resulting XML can be as complex as necessary. For example, the result of an XQuery query may be a complex document, such as an inventory report, a document with dynamic content, or a SOAP (Simple Object Access Protocol) message. The result of an XQuery query can also be as simple as a single integer. For example, the query might count the number of items that satisfy a condition. In XQuery terminology, the result of an XQuery query is an instance of the XQuery data model. The term "XML result" is used herein for simplicity, to refer to the results of an XQuery query.

XQuery goes beyond the functionality of relational query languages, and includes many features traditionally found in functional programming languages. Just as SQL is a relational query language and Java is an object-oriented language, XQuery is often thought of as a native XML programming language. In XQuery, the only complex data structure is XML, and the operations that are regularly needed for processing XML are directly supported in a convenient manner. XQuery can easily search any XML structure with path expressions, create any XML structure using constructors, and transform XML structures using FLWOR (For-Let-Where-Order-Return) expressions. In addition, XQuery simplifies the tasks encountered when working with namespaces or data types.

Because XML is used to represent and transfer data from a wide variety of sources, XQuery is also widely used for data integration. Even when data is not physically stored as XML, XQuery can be used with databases middleware that provides an XML view of the data. For instance, SOAP may be used to acquire data from a variety of sources, and XQuery may be used to query the resulting SOAP messages (in XML) together with data found in a relational database (using an XML view). The SOAP specification is currently maintained by the XML Protocol Working Group of the W3C, and is herein incorporated in its entirety by reference.

The XQuery API for Java (XQJ) is designed to support the XQuery language, just as the JDBC API supports the SQL query language. In particular, XQJ enables a Java application to submit XQuery queries to an XML data source and process the results. In this sense, XQJ is to XQuery what JDBC is to SQL. XQJ is based on XQuery sequences rather than relational result sets. The XQJ specification (JSR 225 is currently maintained by the Java Community Process.

The following example illustrates the basic steps that an application performs to execute an XQuery query using an embodiment of the present invention. To simplify the code, the example contains no error handling. However, error handling may also be integrated into the code, as will be apparent in light of this disclosure. In this example, the application establishes a connection to a relational database using a DDXQDataSource instance. Note that DDXQDataSource refers to an XQuery (XQ) data source function, and the prefix DD indicates a DataDirect implementation of an XQuery data source function. DataDirect Technologies is an operating company of Progress Software Corporation. Other XQuery data source functions can be used as well as will be apparent in light of this disclosure, and the present invention is not intended to be limited to any one particular implementation. This statement equally applies to other "DD" or "dd" implementations referred to herein.

```
//import the XQJ classes
import com.ddtek.xquery.*;
import com.ddtek.xquery.xqj.mediator.DDXQDataSource;
// establish a connection to a data source
DDXQDataSource ds = new DDXQDataSource( );
ds.setJdbcUrl("jdbc:xquery:sqlserver://server1:1433;databaseName=
stocks");
XQConnection conn = ds.getConnection("myuserid","mypswd");
// create an expression object that is used to execute an XQuery query
XQExpression expr = conn.createExpression( );
// the XQuery query
String es = "for $h in collection('HOLDINGS')/HOLDINGS " +
    "where $h/STOCKTICKER='AMZN' " +
    "return $h";
// execute the XQuery query
XQResultSequence result = expr.executeQuery(es);
System.out.println(result.getSequenceAsString( ));
// free all resources
result.close( );
expr.close( );
conn.close( );
```

System Architecture

Figure 1:
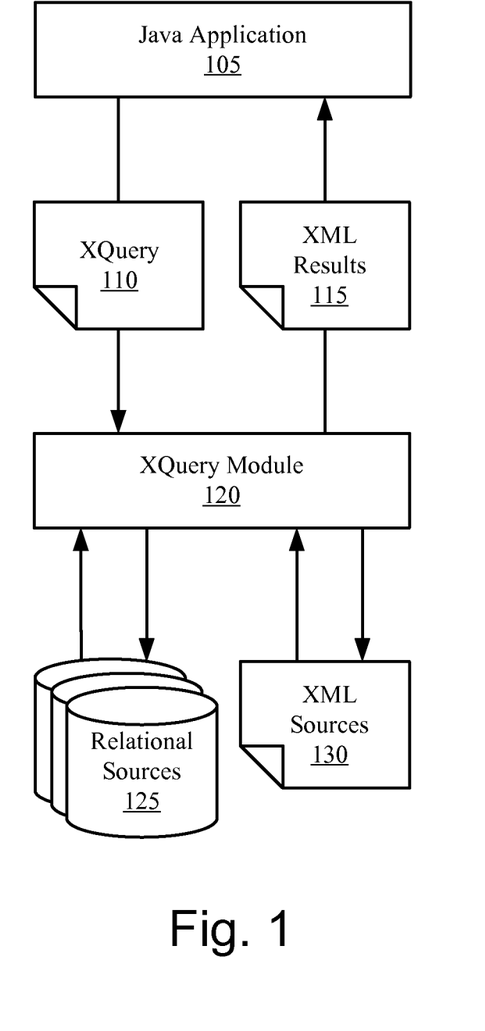
FIG. 1 is a block diagram of an XQuery system configured in accordance with one embodiment of the present invention.

FIG. 1 is a block diagram of an XQuery system configured in accordance with one embodiment of the present invention. As can be seen, the system includes an XQuery module 120 that processes XQuery queries 110 from Java application 105. In response to an XQuery query 110, the XQuery module 120 accesses the appropriate relational sources 125 and/or XML sources 130. XML results 115 are then provided to the application 105.

The system can be implemented in any computing environment. For instance, the Java application 105 and XQuery module 120 can be executing on a conventional computing system, such as a desktop, laptop, or personal digital assistant (PDA). Alternatively, the Java application 105 and XQuery module 120 can be executing on different computing systems that are communicatively coupled (e.g., via a network or direct connection). Relational sources 125 and XML sources 130 can be included in the same computing system as the XQuery module 120, or are otherwise accessible to the XQuery module 120 (e.g., via a network). Numerous computing environments can be used, as will be apparent in light of this disclosure.

The XQuery module 120 of this embodiment operates as a serverless computer component for retrieving relational and/or XML data responsive to a single query 110 from the Java application 105. The module 120 can be embedded, and installs like a driver (e.g., JDBC driver). In one particular configuration, this XQuery module 120 is a Java implementation of XQuery that uses the XQuery API for Java (XQJ) to send queries and return the XML results 115 to the application 105. Thus, application 105 is allowed to query XML sources 130, relational sources 125, or a combination of the two. The XQuery module 120 retrieves data responsive to the query from the relational sources 125 and XML sources 130. Data from relational sources 125 is mapped into XML format. The XQuery module 120 then integrates data from each of the sources into a single response, and sends the XML results 115 to the application 105 via XQJ (or other suitable API).

Note that application 105 can be any application that requires or otherwise uses XML, and need not be limited to Java applications. For instance, the application can be a .Net application. Likewise, the application can be a C, C++, or other object-oriented application. Other such XML-centric applications will be apparent in light of this disclosure.

As previously explained, the XML results can be returned in any number of format, such as text, DOM, SAX, StAX, or other suitable forms. Such an embodiment can run in any Java environment (or other suitable environment), on any operating system (e.g., Windows, Unix, Linux, MAC, etc.), using any number of relational databases (e.g., Oracle, OB2, SQL Server, Sybase, MySQL, etc.), with or without application servers or other servers. Numerous relational and XML sources are supported, such as databases through a JDBC (Java Database Connectivity) connection, XML files through uniform resource identifier (URL) schemes (e.g., http, ftp, and file), and XML represented through an XML API (e.g., DOM).

Embeddable XQuery Module

Figure 2:
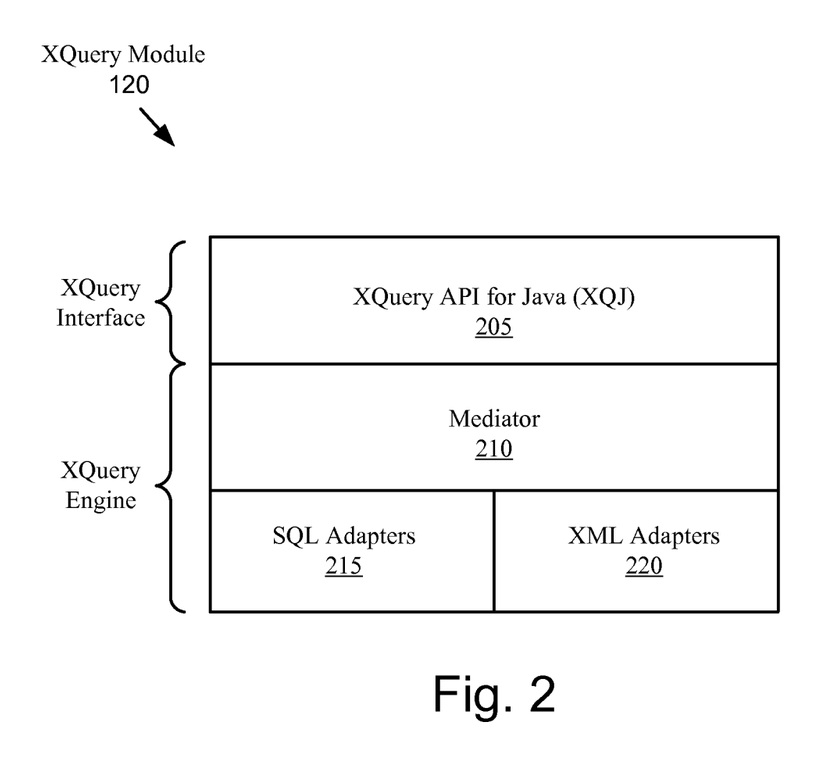
FIG. 2 is a block diagram of an XQuery module of the system of FIG. 1, configured in accordance with one embodiment of the present invention.

FIG. 2 is a block diagram of an XQuery module 120 of the system of FIG. 1, configured in accordance with one embodiment of the present invention. As can be seen, the module 120 includes an XQuery interface and an XQuery engine. In this particular configuration, the XQuery interface is implemented with an XQJ module 205. The XQuery engine, which generates XML results responsive to the XQuery query, is implemented with a mediator module 210, a number of SQL adapters 215, and a number of XML adapters 220.

In operation, a Java application (or other suitable application) passes an XQuery query to the XQJ module 205. The XQJ module 205 implements the XQuery API for Java (XQJ). As previously explained, XQJ enables a Java application to submit XQuery queries to an XML data source and process the results. The XQuery API for Java of the XQJ module 205 can be implemented in accordance with the XQJ specification (JSR 225), or other such suitable standards or specifications (such as those based on or developed from, or otherwise modeled after, JSR 225). Alternatively, the module 205 can be implemented with custom or other non-standards based technology that is programmed or otherwise configured to enable an XML-centric application to submit XQuery queries to XML data sources.

The mediator module 210 analyzes the XQuery query and divides it into one or multiple XQuery expressions to be processed by the adaptors 215 and/or 220. The mediator module 210 sends the XQuery query to the SQL adaptor or the XML adaptor based on its analysis.

If a relational source 125 is queried, the mediator module 210 sends the XQuery query to the corresponding SQL adaptor 215. The SQL adaptor 215 translates the XQuery query into SQL, which is then used to query the appropriate relational database 125. The SQL adaptor 215 receives the SQL results and maps them into XML. Example SQL/XML mappings for various relational databases (e.g., DB2, Oracle, and SQL Server) are shown in the previously incorporated U.S. Provisional Application No. 60/630,837 (e.g., Tables A-49 to A-50). Any number of SQL/XML mapping schemes can be used (e.g., see mapping rules of SQL 2003 standard, which is herein incorporated in its entirety by reference).

If an XML source 130 is queried, the mediator module 210 sends the XQuery query to the corresponding XML adaptor 220, which executes the XQuery query and returns XML results. Each of the adapters 215 and 220 send their XML results to the mediator module 210. If the XML results are obtained from more than one source, the mediator module 210 combines the results. The Java application receives the results as XML, via the XQJ module 205.

Each of the SQL adapters 215 and XML adapters 220 may be configured with query optimizer capability, for determining efficient query plans (e.g., with respect to CPU and/or I/O usage cost). For instance, the SQL adapters 215 can be configured to use join optimization, use temporary tables to store intermediate results, and access only the relevant subset of a table when a query joins two tables. In any case, XML queries that access data from relational sources can be optimized to achieve high performance. Numerous optimization schemes can be used here, as will be apparent in light of this disclosure.

The XQuery module 120 (including each of its components) can be implemented, for example, with software (e.g., C, C++, Java, or other object-oriented programming language), hardware (e.g., gate-level logic), firmware (e.g., embedded routines executing on one or more microcontrollers of a host .device), or some combination thereof. Note that other embodiments may be configured differently than the one shown. For instance, another embodiment may implement the XQuery module 120 on a server (or otherwise in conjunction with a server), if so desired. In one such embodiment, the Java application may be remotely accessing the server, for example, via the Internet or other network. Also, databases containing the relational and XML sources may be local or remote to the module 120. Many variations on the system layout will be apparent in light of this disclosure.

Connecting to XML data sources and relational data sources can be achieved, for example, using XQJ to construct a DDXQDataSource instance in the Java application explicitly, or by using XQJ to load a DDXQDataSource object from JNDI (Java Naming Directory Interface, which is a standard API/SPI for J2EE naming interface), or by configuring an XQuery source configuration file and constructing a DDXQ-DataSource instance in your Java application to reference the source configuration file (the format of a source configuration file is XML).

Specifying connection information explicitly in the Java application using a DDXQDataSource instance allows the information to be coded directly in the Java application. On the other hand, using a DDXQDataSource object loaded from JNDI can be a convenient way to manage connections because the connection information is created and managed outside the applications that use it. Because connection information is outside the application, the effort required to reconfigure the environment when an infrastructure change occurs is minimal. For example, if a database is moved to another server and uses a different port number, only the relevant properties of the data source object need to be changed. An application using the database does not need to change because the application only references the logical name of the data source object in JNDI. A source configuration file also allows connection information for XML and relational data sources to be specified. Similar to using a DDXQData-Source object loaded from JNDI, a source configuration file allows connection information to be managed outside the application, which minimizes changes to the Java application. In addition, most XQuery settings can be set using XQJ. However, a source configuration file can be used if it is desired to change default values of certain XQuery settings, such as the following SQL/XML variables: XMLFOREST, TARGETNS, and Identifier Escaping.

How a typical source configuration file looks depends on whether the XQuery queries access XML and/or relational data sources, as will be apparent in light of this disclosure. For instance, if the Java application executes XQuery queries that access only XML data sources, an example source configuration file would look like the following:

```
<?xml version="1.0" ?>
<XQJConnection xmlns="http://www.datadirect.com/xquery">
    <baseUri>file:///c:/programs/ddxq/examples/</baseUri>
</XQJConnection>
```

The baseUri element in this example specifies the base URI used to resolve relative URIs in fn:doc( ). Other elements can be specified in a source configuration file as well, as will be apparent in light of this disclosure. A source configuration file specifying connection information to a single relational database, Microsoft SQL Server, in this example, looks like the following:

```
<XQJConnection xmlns="http://www.datadirect.com/xquery">
    <JDBCConnection name="example_connection_name">
        <url>jdbc:xquery:sqlserver://localhost:1433</url>
    </JDBCConnection>
</XQJConnection>
```

Standard XQuery uses fn:collection( ) to access relational data, but XQuery does not have the concept of a relational database or a connection. In accordance with an embodiment of the present invention, the XQuery module 120 uses XQJ to specify the required database connections and associate the names specified by fn:collection( ) with the database tables. Using XQJ, a connection can be created from an XQData-Source instance. The class name of the XQuery XQData-Source implementation is: com.ddtek.xquery.xqj.mediator.DDXQDataSource. The following class provides additional properties for configuring connections to multiple databases: com.ddtek.xquery.xqj.mediator.DDX-QJDBCConnection. Connection information can be specified to relational data sources using any of the example methods shown in the following examples.

Example 1

Using a DDXQDataSource Instance to Specify Connection Information Explicitly

```
DDXQDataSource ds = new DDXQDataSource( );
ds.setJdbcUrl("jdbc:xquery:sqlserver://server1:1433;databaseName=stocks");
```

Example 2

Using JNDI

```
Context ctx = new InitialContext( );
DDXQDataSource ds = (DDXQDataSource)ctx.lookup("holdings_ds");
XQConnection conn = ds.getConnection("myuserid", "mypswd");
```

Example 3

Using an XQuery Source Configuration File

```
FileInputStream is = null;
DDXQDataSource ds = null;
```

-continued

```
try {
  is = new FileInputStream("C:\config_files\ms_sql_config.xml");
  ds = new DDXQDataSource(is);
  if (is != null) is.close( );
  }catch(Exception anException) {
  // do something to handle or report the exception
  }
```

After specifying connection information, the getConnection( ) method can be invoked to return a connection to the database and, optionally, specify the user name and password for the connection: XQConnection conn=ds.getConnection ("myuserid", "mypswd").

Next, an XQExpression object is created, which executes an XQuery expression and returns a sequence of results. An XQConnection can create an XQExpression:

```
XQExpression xqExpression = conn.createExpression( );
FileReader fileReader = new FileReader("xquery_file.xq");
XQSequence xqSequence = xqExpression.executeQuery(fileReader);
```

Note that for purposes of this example, the referenced XQuery query is in a separate file named xquery_file.xq. Alternatively, the query can be coded in a String object. Now that the query results are in a sequence, this sequence can be serialized using the getSequenceAsString( ) method: System.out.println(xqSequence.getSequenceAsString( )); The result looks like this:

```
<user>
    <name>
        <FIRSTNAME>Jonathan</FIRSTNAME>
        <LASTNAME>Robie</LASTNAME>
    </name>
    <stock>
        <STOCKTICKER>AMZN</STOCKTICKER>
        <SHARES>3000</SHARES>
    </stock>
    <stock>
        <STOCKTICKER>EBAY</STOCKTICKER>
        <SHARES>4000</SHARES>
    </stock>
    <stock>
        <STOCKTICKER>IBM</STOCKTICKER>
        <SHARES>2500</SHARES>
    </stock>
    ...
</user>
```

In the previous example, data in a relational database was queried. In the next example, an XML file is queried. Assume a user wants to query holdings for a specific customer identified by the USERID element in a file named holdings.xml, which looks like this:

```
<HOLDINGS>
  <row>
    <USERID>Jonathan</USERID>
    <STOCKTICKER>AMZN</STOCKTICKER>
    <SHARES>3000</SHARES>
  </row>
  <row>
    <USERID>Minollo</USERID>
    <STOCKTICKER>EBAY</STOCKTICKER>
    <SHARES>4000</SHARES>
  </row>
</HOLDINGS>
```

Here is an example XQuery expression that returns holdings for a customer named Jonathan: doc("holdings.xml")//HOLDINGS[USERID="Jonathan"]

Now assume the user wants to return holdings for other customers. If an XQuery is written with an external variable that provides the name of the customer whose holdings you require, the Java application can specify the name of the customer before it executes the query. If another external variable is used to represent the document, the Java application can pass any document to the query at runtime. For example:

```
declare variable $u as xs:string external;
declare variable $d as document-node(element(*, xdt:untyped)) external;
$d//holding[USERID=$u]
```

Example Java code to create a DOM tree and bind it to the variable $d is as follows:

```
DocumentBuilderFactory factory = DocumentBuilderFactory.newInstance( );
factory.setNamespaceAware(true);
DocumentBuilder parser = factory.newDocumentBuilder( );
File xmlFile = new File("holdings.xml");
Document document = parser.parse(xmlFile);
```

Once a DOM tree is created, XQJ can be used to bind the DOM tree to a variable and query it. For instance, first, create an expression object, and then bind the document to the variable $d for this expression.

```
XQConnection conn = ds.getConnection( );
XQExpression xqExpression = conn.createExpression( );
xqExpression.bindNode(new QName("d"), document);
```

Now, execute the expression and output the result:

```
FileReader fileReader = new FileReader("xquery_file.xq");
XQSequence xqSequence = xqExpression.executeQuery(fileReader);
System.out.println(xqSequence.getSequenceAsString( ));
```

Joining data from XML and Relational Sources: The previous examples demonstrated how XQJ allows XQuery to operate on relational and XML file data stores. That functionality can be leveraged to query both types of data stores at the same time using a single XQuery query. In this next example, assume a Web Service request is used to provide parameters for the XQuery query, and then query a database to create the Web Service response. The Web Service request looks like this:

```
<request>
    <performance>
        <UserId>Jonathan</UserId>
        <start>2003-01-01</start>
        <end>2003-01-01</end>
    </performance>
</request>
```

The preceding request contains only the SOAP message payload (to simplify the example, the envelope has been omitted). This request asks for performance data on a user's portfolio within a specific date range. Now, an XQuery query can be composed that uses the parameters from the request to create a performance report, which will report the performance of each stock held by each user during the given range.

```
let $request := doc("request.xml")/request
for $user in $request/performance
return
   <portfolio UserID="{$user/UserID}">
   { $request }
   {
   for $h in collection("HOLDINGS")
   where $h/USERID = $user
   return
      <stock>
      {
      $h/STOCKTICKER,
      $h/SHARES
      }
      </stock>
   }
   </portfolio>
```

To be consistent with previous examples, establish a connection to the data source:
XQConnection conn=ds.getConnection( );
Again, create an XQExpression object that executes the XQuery expression and returns a sequence of results:

```
FileReader fileReader = new FileReader("xquery_file.xq");
XQExpression xqExpression = conn.createExpression( );
XQSequence xqSequence = xqExpression.executeQuery(fileReader);
```

With the query results in a sequence, again serialize this sequence using the getSequenceAsString( ) method.
System.out.println(xqSequence.getSequenceAsString( ));
The result looks like this:

```
<portfolio UserID="Jonathan">
   <request>
      <performance>
         <UserId>Jonathan</UserId>
         <start>2003-01-01</start>
         <end>2004-06-01</end>
      </performance>
   </request>
   <stock>
      <STOCKTICKER>PRGS</STOCKTICKER>
      <SHARES>23</SHARES>
   </stock>
   <stock>
      <STOCKTICKER>AMZN</STOCKTICKER>
      <SHARES>3000</SHARES>
   </stock>
   <stock>
      <STOCKTICKER>EBAY</STOCKTICKER>
      <SHARES>4000</SHARES>
   </stock>
   <stock>
      <STOCKTICKER>IBM</STOCKTICKER>
      <SHARES>2500</SHARES>
      <SHARES>2500</SHARES>
   </stock>
</portfolio>
```

Returning Results with Java XML APIs: Often, applications need to retrieve XQuery results, for example, as DOM, SAX, or StAX. XQSequence, as shown in the previous examples, allows the result as a direct mapping of the XQuery sequence. Within an XQSequence, XQItem objects represent each component in an XQuery sequence. Note that instantiating each item in an XQItem object is performance-expensive, because it requires creating multiple objects. Thus, a cost benefit analysis may be appropriate here. The following examples show how to process an XQuery sequence and return the output as DOM, SAX, or StAX.

First, create an XQExpression object that executes the XQuery expression and returns a sequence of results:

```
DDXQDataSource ds = new DDXQDataSource( );
...
XQConnection conn = ds.getConnection("myuserid", "mypswd");
FileReader fileReader = new FileReader("xquery_file.xq");
XQExpression xqExpression = conn.createExpression( );
XQSequence xqSequence = xqExpression.executeQuery(fileReader);
```

To return the output from a sequence as a DOM tree, iterate over each DOM node in the XQuery sequence to extract the DOM content and print the DOM node to the standard System.out. For example, assuming J2SE 1.4.x, use the following code:

```
while(xqSequence.next( )){
   Node domNode = xqSequence.getNode( );
   System.out.println(domNode);
   }
}
```

Variations on this method (e.g., for J2SE 1.5.x) will be apparent in light of this disclosure.

To return the output from a sequence as a SAX event stream rather than a string, create a SAX event handler (named SimpleSAXEventHandler in this example) that sends the results to the standard System.out as shown in the following code:

```
SimpleSAXEventHandler anEventHandler = new
   SimpleSAXEventHandler(System.out);
xqSequence.writeSequenceToSAX(anEventHandler);
```

To return the output from a sequence as a StAX event stream rather than a string, create a StAX reader as shown in the following code:

XMLStreamReader
   reader=xqSequence.getSequenceAsStream( );

This StAX reader functionality can be used like any other StAX stream reader. For example, the following code reads one event at a time and prints the event type together with the associated event names.

```
private static void formatOutput(XMLStreamReader reader) throws
XMLStreamException {
while(true){
   int event = reader.next( );
   if(event == XMLStreamConstants.END_DOCUMENT){
   return;
   switch (event) {
      case XMLStreamConstants.START_ELEMENT;
      System.out.println("Start tag; ");
      printNames(reader);
      break;
      case XMLStreamConstants.END_ELEMENT:
      System.out.println("End tag");
      printNames(reader);
      break;
      case XMLStreamConstants.START_DOCUMENT;
      System.out.println("Start document");
      break;
```

```
            case XMLStreamConstants.CHARACTERS;
                System.out.println("Text");
                printChars(reader);
                break;
            }
        }
    }
    ...
```

Preparing XQuery Statements: Typically, when an XQuery query is executed, the query is parsed and optimized before it is run. To avoid incurring this overhead each time the query is used, prepare the query once and execute it multiple times. Here is example code for creating a prepared query:

```
    DDXQDataSource ds = new DDXQDataSource( );
    XQConnection conn = ds.getConnection( );
    FileReader fileReader = new FileReader("xquery_file.xq");
    XQPreparedExpression preparedExpression =
    conn.prepareExpression(fileReader);
    Once the query is prepared, use an executeQuery( ) call to execute it,
    XQSequence xqSequence = preparedExpression.executeQuery( );
    System.out.println(xqSequence.getSequenceAsString( ));
```

Queries can accept parameters that can be changed between executions. For example, it may be desirable to prepare a query that selects holdings based on a particular customer. In the following example query, the value of USERID, a particular customer, changes each time this XQuery is run.

```
    declare variable $1 as xs:string external;
        collection("HOLDINGS")/HOLDINGS[USERID=$1]
```

The value of $1 can be set using XQJ as shown here. This can be run for each different user (in this case, twice).

```
    preparedExpression.bindString(new QName("1"), "Jonathan");
    xqSequence xqSequence = preparedExpression.executeQuery( );
    System.out.println("\n\nHoldings for Jonathan:\n\n");
    System.out.println(xqSequence.getSequenceAsSring( ));
    preparedExpression.bindString(new QName("1"), "Minollo");
    xqSequence xqSequence = preparedExpression.executeQuery( );
    System.out.println("\n\nHoldings for Minollo:\n\n");
    System.out.println(xqSequence.getSequenceAsString( ));
```

Performance Optimization

XQueries carried out in accordance with embodiments of the present invention can be optimized or otherwise configured to improve their performance, if so desired. Various such performance optimizations, including value comparisons, XQuery compensation, query pooling, option declarations, and extensions expressions, will now be discussed.

Value Comparisons: When an XQuery encounters comparisons in WHERE clauses or in predicate expressions and an operand is bound to data in an XML data source, performance can be significantly improved if this operand is known by mediator module 210 of the XQuery module 120 to be a single item. Consider the following query:

```
    for $request in doc('file:///c:/in/request.xml')/request
        let $ticker := $request/performance/ticker,
            $start := $request/performance/start,
            $end := $request/performance/end
        for $h in collection('HISTORICAL')/HISTORICAL
        where $h/TICKER = $ticker
        return $h
```

The XQuery does not know how many ticker, start, or end elements may occur in the XML source, so it restricts its rewrites in case there is more than one of each of these elements. Using value comparisons instead of general comparisons, as shown in the following code, makes this query run faster:

```
    for $request in doc('file:///c:/in/request.xml')/request
        let $ticker := $request/performance/ticker,
            $start := $request/performance/start,
            $end := $request/performance/end
        for $h in collection('HISTORICAL')/HISTORICAL
        where $h/TICKER eq $ticker
        return $h
```

Note that this does not work for all data types, because eq is more restrictive in the types that it accepts, and does less implicit casting.

XQuery Compensation: XQuery contains expressions, functions, and operators that cannot be directly translated into SQL. For example, fn:tokenize( ) has no SQL equivalent. When an expression cannot be translated to SQL, the XQuery module 120 "compensates" the expression; in particular, it executes the expression in the mediator module 210 using data retrieved from the relational database 125. This provides full featured XQuery functionality. Note that such compensation may be slower than executing an expression in the database. Sometimes, the same result can be obtained by using an expression that does not require compensation.

For example, suppose a user needs to perform string comparisons with data that contains trailing spaces. The XQuery function normalize-space( ) can be used, which removes leading and trailing spaces:

```
    for $h in collection('stocks.dbo.HISTORICAL')/HISTORICAL
        where normalize-space($h/TICKER) = 'AMZN'
        return $h
```

However, the normalize-space( ) function is compensated, which means that the where clause is evaluated in the mediator module 210 rather than in the relational database 125, which may slow performance. For this example, the most efficient solution is to use the SQL function rtrim( ), which is available in most commercial databases:

```
    declare function ddtek-sql:rtrim($in as xs:string) as
        xs:string external;
        for $h in collection('HISTORICAL')/HISTORICAL
        where ddtek-sql:rtrim($h/TICKER) = 'AMZN'
        return $h
```

Query Pooling: If a Java application executes the same queries again and again, performance can be improved by enabling internal query pooling of the XQuery module 120. Query pooling allows the application to reuse queries that have been executed. In one such embodiment of the present invention, when query pooling is enabled, the mediator module 210 of the XQuery module 120 caches a specified number of queries executed by an application. In one such embodiment, the XQuery module 120 pools queries executed using XQExpression and XQPreparedExpression. Using XQJ, query pooling can be enabled, for example, by specifying the DDXQDataSource MaxPooledQueries property or using an XQuery source configuration file by specifying the maxPooledQueries element (a child element of the XQJConnection element). For example, if the DDXQDataSource MaxPooledQueries property is set to 20, one embodiment of the XQuery module 120 caches the last 20 queries executed by the application. If the value set for this property is greater than the number of queries used by the application, all queries are cached.

Option Declarations: Option declarations provide parameters that modify how one embodiment of the XQuery module 120 processes queries. They are similar to extension expressions, which modify how another embodiment of the XQuery module 120 processes expressions in a query. In one such embodiment, mediator module 210 of the XQuery module 120 is configured to enable option declarations. A global option declaration is used as the default for all XML and relational data sources accessed by XQuery queries in the Java application. One global option declaration supported by an embodiment of the XQuery module 120 is referred to as detect-XPST0005. A connection-specific option declaration controls the processing of XQuery queries for a specific connection. Valid option declarations include, for example, detect-XPST0005, sql-decimal-cast, and sql-unicode-literals. As option declaration can be specified, for example, using any of the following methods.

Using the prolog of the XQuery query: The syntax for specifying an option declaration in a query is: declare option ddtek:name_of_option_declaration "value". For example: declare option ddtek:sql-unicode-literals "yes".

Using the properties of the DDXQDataSource and DDXQJDBCConnection class: To specify an option declaration as global, use the Pragmas property of the DDXQDataSource class. To specify an option declaration as connection-specific, use the JdbcPragmas property of the DDXQDataSource class or the Pragmas property of the DDXQJDBCConnection class. Using an XQuery source configuration file: To specify an option declaration as global, use the pragma element (a child element of the XQJConnection element). To specify an option declaration as connection-specific, use the pragma element (a child element of the JDBCConnection element).

In the following example, detect-XPST0005=no is specified as a global option declaration. This disables the XPST0005 error, which is raised during static analysis under certain conditions. In addition, the example specifies sql-decimal-cast=20, 15 as a connection-specific option declaration. This instructs the XQuery module 120 to process a query with a specific precision and scale for xs:decimal( ) values.

```
DDXQDataSource ds = new DDXQDataSource( );
ds.setJdbcUrl("jdbc:xquery:sqlserver://server1:1433;databaseName=
stocks");
ds.setPragmas("detect-XPST0005=no");
ds.setJdbcPragmas("sql-decimal-cast=20,15")
XQConnection conn = ds.getConnection("myuserid","mypswd");
XQExpression xqExpression = connection.createExpression( );
FileReader fileReader = new FileReader("xquery_file.xq");
XQSequence xqSequence = xqExpression.executeQuery(fileReader);
```

The option declaration detect-XPST0005 determines whether err:XPST0005 is raised during static analysis. If set to yes (the default), the error message err:XPST0005 is raised if the static data type assigned to an XQuery expression other than the expression( ) or data( )) is void( ). For example, this error is raised if an XQuery can statically determine that a path expression can never match an item (e.g., because the name of an element is misspelled in a NameTest). If set to no, the err:XPST0005 is not raised and the expression is evaluated. This option declaration can be specified as a global or connection-specific option declaration.

The option declaration sql-decimal-cast determines precision and scale used for xs:decimal( ). If a precision and scale are not specified, the following example default values are used:

DB2: 30, 15
Oracle: Not applicable
Microsoft SQL Server: 38, 19
Sybase: 38, 19

You can override the default by using this option declaration. This option declaration can be specified as a connection-specific option declaration.

The option declaration sql-unicode-literals {yes|no} determines whether XQuery literals are translated to SQL literals escaped with the Alternate National Character Set escape character N. If set to yes, XQuery literals are translated to SQL literals escaped with the Alternate National Character Set escape character N. Set the value of this option declaration to yes when a SQL literal contains characters that cannot be translated to the code page of your database. Then, execute the query using this option declaration. If set to no (the default), XQuery literals are not translated. Note that some databases are significantly slower than others when Unicode comparisons are performed. This option declaration can be specified as a connection-specific option declaration.

Extension Expressions: Extension expressions provide parameters that modify how one embodiment of the XQuery module 120 processes expressions in a query. Extension expressions can be specified only in the body of a query. In one embodiment of the XQuery module 120, mediator module 210 is configured to implement the extension expression of evaluate-in-memory. The syntax for specifying an extension expression in a query is: (# ddtek:name_of_extension_expression #). For example: (#ddtek:evaluate-in-memory #).

Suppose a user wants to perform data analysis using the following query, which accesses the HISTORICAL database table and returns the ratio of the value of ADJUSTEDCLOSE to the value of ACTUALCLOSE for a particular date.

```
for $h in collection('HISTORICAL')/HISTORICAL
where $h/TICKER = 'AMZN'
return
   <historical>
   {$h/DATETRADED}
   {$h/ADJUSTEDCLOSE div $h/ACTUALCLOSE}
   </historical>
```

Suppose that ACTUALCLOSE is 0 for one or multiple dates because of a data entry error. In XQuery, division by 0 raises an error for decimal and integer data types, but not for float and double data types. The user can avoid an error by casting the ratio to a double data type and performing the division in memory by specifying the evaluate-in-memory extension expression for the division expression as shown in the following query:

```
for $h in collection('HISTORICAL')/HISTORICAL
where $h/TICKER = 'AMZN'
return
   <historical>
   {$h/DATETRADED}
```

```
{(# ddtek:evaluate-in-memory #)
{xs:double($h/ADJUSTEDCLOSE) div $h/ACTUALCLOSE}}
</historical>
```

The evaluate-in-memory extension expression specifies an expression that is evaluated in memory as XQuery, ensuring that it will not be translated to SQL for evaluation in a relational data source. This extension expression can be used, for example, to ensure that XQuery module 120 uses strictly conforming XQuery behavior when processing data from relational data-sources. For relational data sources, XQuery module 120 sometimes uses compensation to allow expressions to be evaluated efficiently (as previously described). When strict conformance to the XQuery specification is more important than efficient data handling, use this extension expression.

The evaluate-in-memory extension expression can also be used, for example, to provide XQuery functionality not typically provided for relational data sources. For instance, use this extension expression to perform path expressions on XML stored in the database. This setting ensures maximum XQuery conformance, but can significantly degrade performance depending on how it is used. For example, if used in a where clause of a FLWOR expression, it can force all rows of a database table to be evaluated in memory, which degrades performance. The expression used for evaluation in memory cannot contain the following functions: fn:collection( ), fn:doc( ), and fn:doc-available( ).

Methodology

Figure 3:
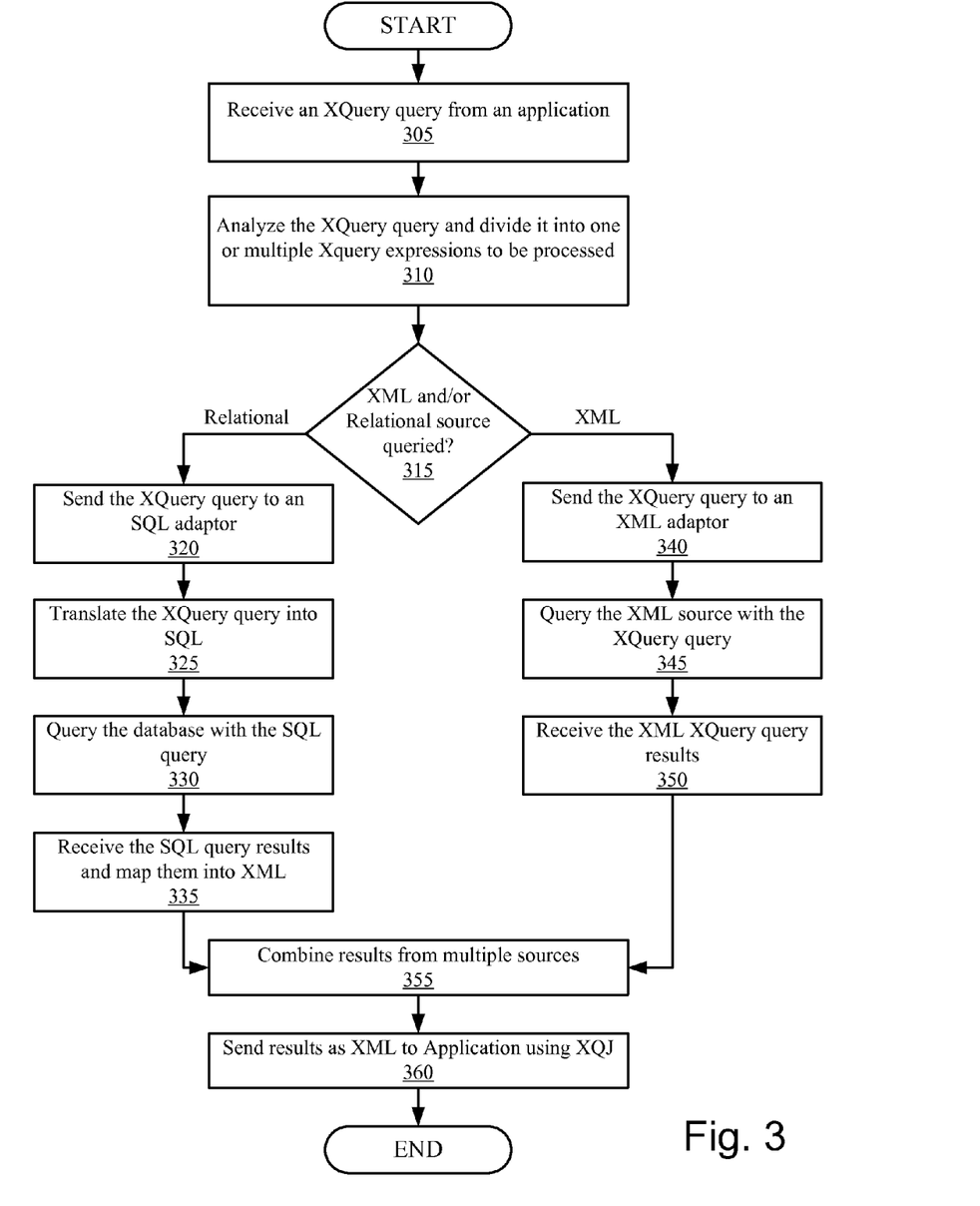
FIG. 3 illustrates a method for transforming between relational data and XML data, in accordance with one embodiment of the present invention.

FIG. 3 illustrates a method for transforming between relational data and XML data, in accordance with one embodiment of the present invention. This method can be carried out, for example, by the XQuery module 120 of FIGS. 1 and 2. Recall that the module 120 can be implemented in software, hardware, firmware, or some combination thereof. Further recall that the module 120 can be embedded, and installs like a driver.

The method begins with receiving 305 an XQuery query from an application (e.g., Java application). In one embodiment, this step is carried out by the XQuery API for Java (XQJ) module 205, as previously explained.

The method proceeds with analyzing 310 the XQuery query, and dividing it into one or multiple XQuery expressions to be processed. In the case where both XML and relational data sources are being queried at the same time using a single XQuery query, some of the XQuery expressions can be relational queries and other XQuery expressions can be XML queries. Each of these one or more XQuery expressions can then be processed (e.g., individually and/or in parallel). In particular, for each of the one or more XQuery expressions, the method continues with determining 315 if an XML or relational data source is being queried, or both XML and relational data sources are being queried. Note that in one particular embodiment, the functionality of steps 310 and 315 are carried out by the mediator module 210, as previously explained. The mediator module 210 can then send the query to the appropriate XML or relational adapters (as in steps 320 and 340).

If a relational data source is being queried, then the method continues with sending 320 the XQuery query to one or more SQL adaptors, and translating 325 the XQuery query into SQL. The method then continues with querying 330 the relational database with the SQL query, and then receiving 335 the SQL query results and mapping them into XML. Note that the functionality of steps 325, 330, and 335 can be carried out, for example, by the one or more of the SQL adapters 215, as previously explained with reference to FIG. 2.

If, on the other hand, an XML data source is being queried, the method continues sending 340 the XQuery query to one or more XML adaptors. The method then proceeds with querying 345 the XML source with the XQuery query, and receiving 350 the XML XQuery query results. Here, the functionality of steps 345 and 350 can be carried out, for example, by the one or more of the XML adapters 220, as previously explained.

The method continues with combining 355 results from multiple sources, if the case where both XML and relational sources are accessed, or more than one of either relational or XML data sources. In one particular embodiment, the functionality of step 355 is carried out by the mediator module 210, as previously explained. The method then continues with sending 360 the results as XML to the requesting application using, for example, the XQuery API for Java (e.g., XQJ module 205).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer-implemented method comprising:
   receiving, by a processor, an XQuery query from a Java application via an XQuery API for Java (XQJ), the Java application attempting to access a relational data source having a relational data model;
   generating, by the processor, XML results responsive to the XQuery query and based on data from the relational data source by:
      dividing the XQuery query into one or more XQuery expressions;
      determining for the one or more XQuery expressions whether an XML data source or the relational data source is being queried, the one or more XQuery expressions including a first XQuery expression querying the relational data source;
      determining that the first XQuery expression cannot be translated into one or more relational queries for the relational data source and equivalent to the first XQuery expression;
      retrieving, by an XQuery engine having a first data model incompatible with the relational data model, the relational data from the relational data source; and
      executing, in the XQuery engine, the first XQuery expression using the retrieved relational data to generate, at least in part, the XML results responsive to the XQuery query and based on the relational data retrieved from the relational data source, the XML results responsive to the XQuery query and based on data from the relational data source generated without one or more relational queries equivalent to the first XQuery expression; and
   sending the XML results to the Java application via the XQJ.

2. The method of claim 1, wherein generating the XML results responsive to the XQuery query further comprises combining results from multiple data sources.

3. The method of claim 1, wherein in response to relational data source queries, generating the XML results comprises:
translating the XQuery query into an SQL query;
querying the relational data source with the SQL query;
receiving one or more SQL query results; and
mapping the one or more SQL query results into XML.

4. The method of claim 1, wherein in response to XML data source queries, generating the XML results comprises:
querying the XML data source with the XQuery query; and
receiving one or more XML XQuery query results.

5. The method of claim 1, further comprising:
combining the XML results generated from multiple sources.

6. The method of claim 1, further comprising:
performing comparisons using value comparison operators.

7. The method of claim 1, further comprising:
caching a number of executed queries for reuse.

8. The method of claim 1, wherein generating the XML, results responsive to the XQuery query comprises retrieving both data stored in relational form and data stored in XML form responsive to a single XQuery query.

9. The method of claim 1, further comprising:
processing the XQuery query using an XQPreparedExpression to create a prepared query, the XQuery query prepared once and available for multiple executions; and
caching the prepared query in a query pool for reuse.

10. A non-transitory machine-readable storage medium having machine-executable instructions, that when executed by a processor, cause the processor to carry out a process comprising:
receiving an XQuery query from a Java application via an XQuery API for Java (XQJ), the Java application attempting to access a relational data source having a relational data model;
generating XML results responsive to the XQuery query and based on data from the relational data source by:
dividing the XQuery query into one or more XQuery expressions;
determining for the one or more XQuery expressions whether an XML data source or the relational data source is being queried, the one or more XQuery expressions including a first XQuery expression querying the relational data source;
determining that the first XQuery expression cannot be translated into one or more relational queries for the relational data source, and equivalent to the first XQuery expression;
retrieving, by an XQuery engine having a first data model incompatible with the relational data model, the relational data from the relational data source; and
executing, in the XQuery engine, the first XQuery expression using the retrieved relational data to generate, at least in part, the XML, results responsive to the XQuery query and based on the relational data retrieved from the relational data source, the XML results responsive to the XQuery query and based on data from the relational data source generated without one or more relational queries equivalent to the first XQuery expression; and
sending the XML results to the Java application via the XQJ.

11. The non-transitory machine-readable storage medium of claim 10, wherein generating the XML results responsive to the XQuery query further comprises combining results from multiple data sources.

12. The non-transitory machine-readable storage medium of claim 10, wherein in response to relational data source queries, generating the XML results comprises:
translating the XQuery query into an SQL query;
querying the relational data source with the SQL query;
receiving one or more SQL query results; and
mapping the one or more SQL query results into XML.

13. The non-transitory machine-readable storage medium of claim 10, wherein in response to XML data source queries, generating the XML results comprises:
querying the XML data source with the XQuery query; and
receiving one or more XML XQuery query results.

14. The non-transitory machine-readable storage medium of claim 10, wherein the process further comprises:
combining the XML, results generated from multiple sources.

15. The non-transitory machine-readable storage medium of claim 10, wherein the process further comprises:
performing comparisons using value comparison operators.

16. The non-transitory machine-readable storage medium of claim 10, wherein the process further comprises:
caching a number of executed queries for reuse.

17. The non-transitory machine-readable storage medium of claim 10, wherein generating the XML results responsive to the XQuery query comprises retrieving both data stored in relational form and data stored in XML form responsive to a single XQuery query.

18. A system comprising:
a processor; and
a machine-readable storage medium having machine-executable instructions, that when executed by the processor, cause the processor to carry out a process for transforming between the relational data and the XML data, the process including:
receiving an XQuery query from an application attempting to access a relational data source having a relational data model; and
an XQuery engine, the XQuery engine having a first data model incompatible with the relational data model, for generating XML results responsive to the XQuery query and based on data from the relational data source by:
dividing the XQuery query into one or more XQuery expressions;
retrieving the relational data from the relational data source;
executing a first XQuery expression using the retrieved relational data to generate, at least in part, the XML results responsive to the XQuery query and based on the relational data retrieved from the relational data source, the XML results generated without one or more relational queries equivalent to the first XQuery expression; and
sending the XML results to the application via the XQuery interface; and
wherein the XQuery engine includes a mediator module for determining for the one or more XQuery expressions whether an XML data source or the relational data source is being queried, the one or more XQuery expressions including the first XQuery expression querying the relational data source and determining that the first XQuery expression cannot be translated into one or more relational queries for the relational data source and equivalent to the first XQuery expression.

19. The system of claim 18, wherein the XQuery interface is an XQuery API for Java (XQJ) module and the application is a Java application.

20. The system of claim 18, wherein the mediator module is further configured for combining results from multiple data sources.

* * * * *